United States Patent Office 3,327,347
Patented June 27, 1967

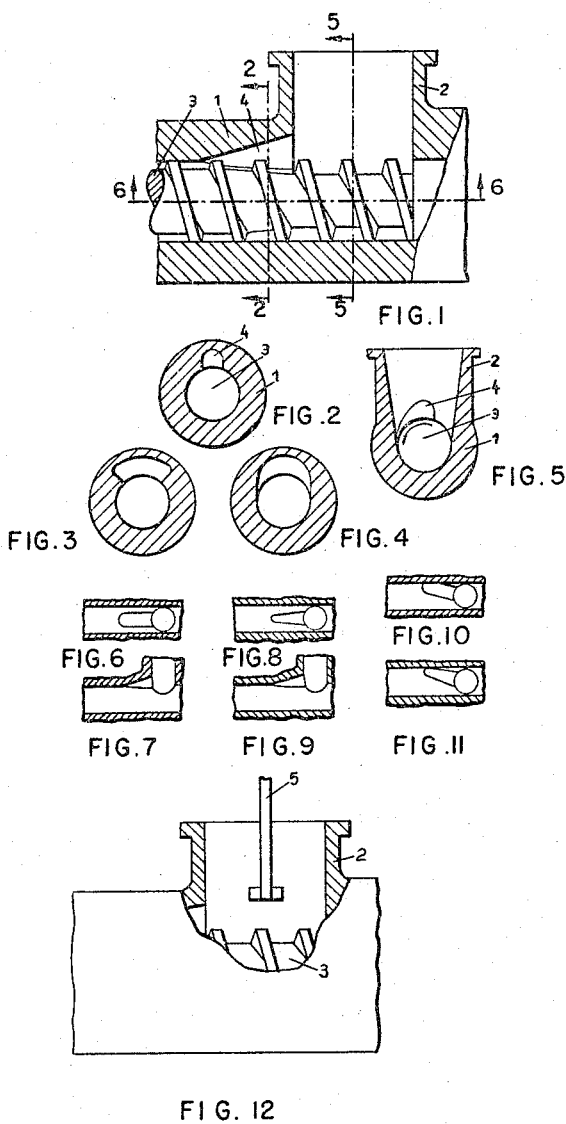

3,327,347
EXTRUDER FOR PROCESSING SOLID
THERMOPLASTICS
Heinz Schippers, Remscheid-Lennep, Germany, assignor to Barmer Maschinenfabrik Aktiengesellschaft, Wuppertal-Oberbarmen, Germany
Filed Oct. 5, 1965, Ser. No. 493,099
Claims priority, application Germany, May 29, 1965, B 82,168
5 Claims. (Cl. 18—12)

The present invention relates to an extruder for processing solid thermoplastics, particularly of small pulverized sizes, having a very low bulkweight and surface characteristics preventing their spontaneous free flow under conditions of gravity.

For the purposes of this disclosure, these thermoplastics will be referred to hereinafter only as "non-fluid." In particular, this invention relates to a single-screw extruder of non-fluid pulverous thermoplastics, having an entrance pocket in the feeding zone of the screw.

In summary, the device of this invention is a single-screw extruder of non-fluid thermoplastic pulverous material comprising a screw jacket means having an inlet end, and extruder screw disposed within said jacket means, and a plastic material feed inlet means communicating with the inlet end of said jacket means. The inside width of the feed inlet has a size substantially at least as large as the diameter of the extruder screw. The inner surface of the jacket means defines an entrance pocket extending from said feed inlet means for at least the length of a simple screw pitch in the axial direction or conveying of the screw. The entrance pocket has its greatest cross-sectional area adjacent the feed inlet. The radial distance from the upper edge of the screw thread to the upper surface of the pocket decreases constantly from adjacent the feed inlet means in the conveying direction away from the feed inlet.

In copending application Ser. No. 492,518 for a "Plastic Melt Extruder," filed by Guenter Roehlig and Guenter Augustin on Oct. 4, 1964, and owned by the assignee of this application, an axially extending entrance pocket for a screw extruder for processing thermoplastics, resins is disclosed. Therein the raw material is fed to the screw in a fluid or plasticized state, i.e., from a viscous to a highly fluid form, for example in a honey-like consistency. With the entrance pocket, complete filling of the screw threads in the cylinder is obtained, and sufficiently high pressures can be achieved for flawless and reliable processing of the fluid plastics.

Similar difficulties in feeding and conveying in screw extruders of conventional construction are also observed in a particularly severe form during the processing of extremely pulverulent material having a very low bulk weight, such as, for example, low-pressure crude polyethylene, certain types of emulsion polyvinyl chloride resins, polypropylene, and other plastics. In order to obviate the difficulties in feeding and conveying these non-fluid particles and powders, it is conventional to employ double or multiple screw extruders, or at least screw extruders having special feeding or tamping screw arrangements. As a result, complicated construction problems are encountered with these extruders and it is very difficult to obtain satisfactory extrusions in terms of output and quality of products.

It is the object of this invention to provide a device for feeding and conveying non-fluid solid plastic particles and powders which is not subject to these deficiencies.

These objectives are obtained with a modification of the previously disclosed combination for extruding molten plastics. The screw extruder of this invention has an axial entrance pocket for the processing of thermoplastic synthetics which are fed to the inlet zone of the screw in a solid state of aggregation. The device of this invention is particularly suitable for processing plastics in a non-fluid form such as powders, chips, slices or other particles of low bulk weight. In order to ensure a reliable conveyance of the feed material to the screw, it is necessary that the latter be tightly enclosed in the entrance zone by the wall of the cylinder along a circular arc of from at least 180° to 270°. Thus, the material fed to the extruder is pressed into the screw threads under the shearing, peeling and wedging effect of the entrance pocket and is subsequently transported immediately under force into the space enclosed by the cylinder wall. The screw threads are thereby completely filled. The largest cross-section of the entrance pocket is adjacent the filling port and is within the legs of a sector angle having the screw axis as its vertex, this angle being less than 180° and preferably from 45° to 90°.

Experiments have confirmed that, surprisingly, this device eliminates the difficulties in the feeding and conveying process in a completely satisfactory manner, even when processing extremely pulverulent, powder-like material having a very low bulk weight. Sufficiently high pressures can be obtained in the cylinder of the screw extruder without a special feed screw or a double screw arrangement, thus avoiding many disadvantages which are present in previously known devices.

For the processing of powders having a low bulk weight, it is desirable to make the inside width of the feed inlet approximately equal to or larger than the diameter of the screw, and preferably to provide an agitating device such as a stirrer in the feed inlet.

In the drawings several embodiments of the invention are illustrated.

FIGURE 1 shows a longitudinal section through the feed inlet zone and the portions of the screw extruder joining this zone on the left and on the right;

FIGURES 2 through 4 illustrate various cross-sectional shapes according to section 2—2 of FIGURE 1;

FIGURE 5 shows a further possible cross-sectional shape along section 5—5 of FIGURE 1;

FIGURES 6 through 11 show various positions and constructions of the entrance pocket; and FIGURE 12 is a longitudinal section of an extruder with an agitator in the feed inlet.

Referring to FIGURE 1, the screw 3 is provided in the cylinder 1 which has a feed inlet 2. The cylinder section joining the entrance port is provided, according to this invention, with an entrance pocket 4 gradually tapering in the conveying direction. The radial distance between the upper surface of the entrance pocket defined by the screw jacket and the screw thread decreases constantly in the conveying direction, away from the feed inlet.

The breadth and height, as well as the length and/or the slope of the upper surface of this axial entrance pocket can be specially adjusted to the bulk weight and flow properties of the material to be processed and to the friction between the contacting, loose particles of the plastic material. The length of the pocket, determined by the angle of inclination with respect to the screw axis, is of particular importance. This length should extend along several screw threads. For reasons of ease in the manufacture, as well as for functional reasons, the wall of the pocket can be a segment of a cylinder as shown in FIGURES 6, 7 and 10, or a segment of a cone as shown in FIGURES 8, 9 and 11. The recess defined by the screw cylinder wall 1 can have the shape of a cylinder or cone having an axis which intersects the screw axis as shown in FIGURES 6, 7, 8, and 9, or which is askew therewith in the direction of rotation of the screw as shown in FIG- URES 10 and 11. Likewise, it is possible to fashion the surface of the pocket in an asymmetrical manner as a curved surface, for example, with the cross-section illustrated in FIGURE 5, wherein the radial distance from the screw thread to the upper surface of the pocket decreases in the direction of rotation of the screw. In each case, the decrease in volume of the entrance pocket in the direction of the screw axis or the conveying path can be adapted to the bulk weight of the plastic, and the axial direction of the recess can be adapted to the fluidity of the feed material. The decrease in volume can be increased for larger material bulk weights. The longitudinal dihedral angle between the screw axis and the axial direction of the recess can be increased for less fluid material.

The feed material conveyed by the first screw threads along the circumference thereof into the axial entrance pocket is pressed into the screw threads under the wedge effect of the pocket wall inclined toward the screw axis. The excess material swept aside at the cylinder wall is pressed into the screw thread sections which are only partially filled. For example, if the filling zone is completely filled an accumulation of material can be observed in the entrance pocket adapted to the inclined wall and having a tendency to move at right angles to the screw axis or backward. This accumulation is continuously depleted, but is increased again to the same extent by newly arriving material.

Because of the size of the entrance pocket, the inlet zone of the conveyor screw is extended along a relatively large distance in the axial direction, for at least the distance of two simple screw pitches. Thereby several screw threads are always simultaneously in a position to entrain the raw material, to conveyor the same into the cylinder space, and in this manner, to produce the pressure necessary for extruding the mass.

FIGURE 12 shows the screw extruder of this invention with an agitation device such as a stirrer 5 for facilitating feeding of very low density powders into the extruder feed inlet 2.

Obviously, many modifications and variations of the invention as hereinabove set forth can be made without departing from the essence and scope thereof, and only such limitations should be applied as are indicated in the appended claims.

What is claimed is:

1. A screw extruder for the processing of non-free-flowing pulverous plastic solids of low bulkweight comprising a screw jacket means having an inlet end, an extruder screw disposed within said jacket means, a plastic material feed inlet means communicating with the inlet end of said jacket means, the inside width of said feed inlet having a size substantially at least as large as the diameter of the extruder screw, and an entrance pocket defined by the inner surface of the jacket means, said pocket extending from said feed inlet means for at least the length of a simple screw pitch in the axial direction of the screw, said pocket having its greatest cross-sectional area adjacent the feed inlet means, and the radial distance from the upper edge of the screw thread to the upper surface of the pocket decreasing constantly from adjacent the feed inlet means in the direction away from the feed inlet means; wherein the largest cross-sectional area of the entrance pocket adjacent the feed inlet means is within the legs of a sector angle having the screw axis as its vertex, the sector angle being within the range of from 45° to 90°.

2. The screw extruder of claim 1 wherein the inside width of the feed inlet means in the axial direction of the screw is at least as large as two simple screw pitches.

3. The screw extruder of claim 1 wherein the entrance pocket is askew from the feed inlet means in the direction of rotation of the feed screw.

4. The screw extruder of claim 1 wherein the cross-sectional shape of the entrance pocket is asymmetrical, and the radial distance from the screw thread to the upper surface of the pocket decreases in the direction of rotation of the screw.

5. The screw extruder of claim 1 comprising an agitation means extending into the feed inlet means.

References Cited

UNITED STATES PATENTS

| | | | |
|---|---|---|---|
| 1,226,642 | 5/1917 | Demovitsch. | |
| 1,923,678 | 8/1933 | Lowell. | |
| 2,225,015 | 12/1940 | Lebelle | 25—41 X |
| 2,295,823 | 9/1942 | Banigan et al. | 18—12 X |
| 2,422,722 | 6/1947 | Fielitz | 18—12 |
| 2,611,941 | 9/1952 | Leitl | 18—12 X |
| 2,796,901 | 6/1957 | Autio | 146—184 |

WILLIAM J. STEPHENSON, *Primary Examiner.*